Feb. 13, 1962 R. W. SWANK 3,021,032
FUEL DISPENSING UNIT
Filed Sept. 2, 1958 2 Sheets-Sheet 1
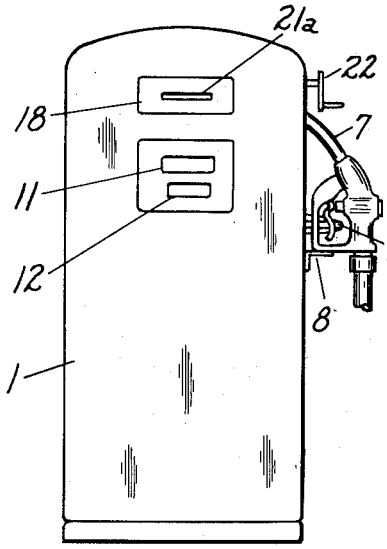
FIG. 1
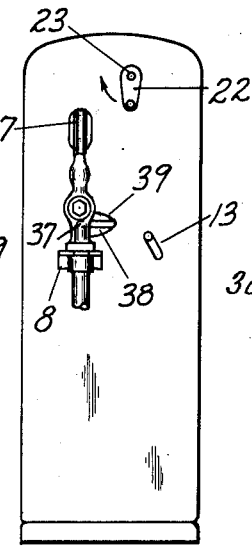
FIG. 2
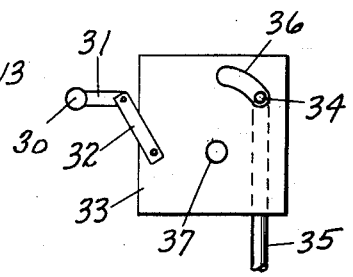
FIG. 5
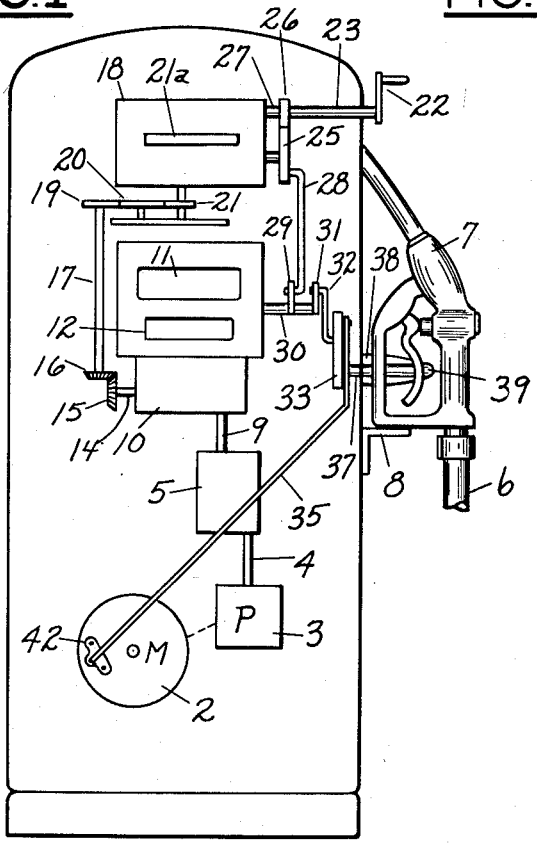
FIG. 3
FIG. 4
INVENTOR.
Rehl W Swank
BY
Ralph Hammar
Attorney Feb. 13, 1962 R. W. SWANK 3,021,032
FUEL DISPENSING UNIT
Filed Sept. 2, 1958 2 Sheets-Sheet 2

INVENTOR.
REHL W. SWANK
BY
Andrus & Starke
Attorneys

United States Patent Office 3,021,032
Patented Feb. 13, 1962

3,021,032
FUEL DISPENSING UNIT
Rehl W. Swank, Venango Township, Crawford County, Pa., assignor, by mesne assignments, to A. O. Smith Corporation, Milwaukee, Wis., a corporation of New York
Filed Sept. 2, 1958, Ser. No. 758,356
7 Claims. (Cl. 222—30)

This invention is intended to prevent the printing of false records in fuel dispensing units equipped with a delivery ticket printing register.

Fuel dispensing units now have a computing register exhibiting the gallons and dollar value of each fuel delivery and equipped with an interlock requiring it to be cleared or reset after each delivery to prevent registering of fuel from a prior delivery to a succeeding customer. The ticket printing register is intended to prevent errors in bookkeeping for charge customers by printing the figures exhibited on the computer register. The ticket printing register likewise must be reset after each operation but since the same dispensing unit can be used for charge and non-charge customers, there has existed the possibility of error in the printing due to failure to reset the printing register before the start of a delivery to a charge customer. There has also existed the possibility of failure to print a delivery to one customer and cumulating the unprinted delivery in the charge printed for a succeeding customer. This invention is intended to prevent errors of this type by controlling both the computer and ticket printing registers from a common interlock device which prints the delivery ticket and clears or resets the printing register to zero at the same time and with the same manual operation as is required to reset the computing register. The resetting of the registers is made mandatory by the fact that the reset also controls the operating switch for the dispensing unit pump. It is accordingly impossible for the service station operator to reset the computing register without clearing the ticket printer and the ticket printer accordingly cannot accumulate more than a single delivery on the printed ticket and thus provide a customer with a false record.

Figure 6:
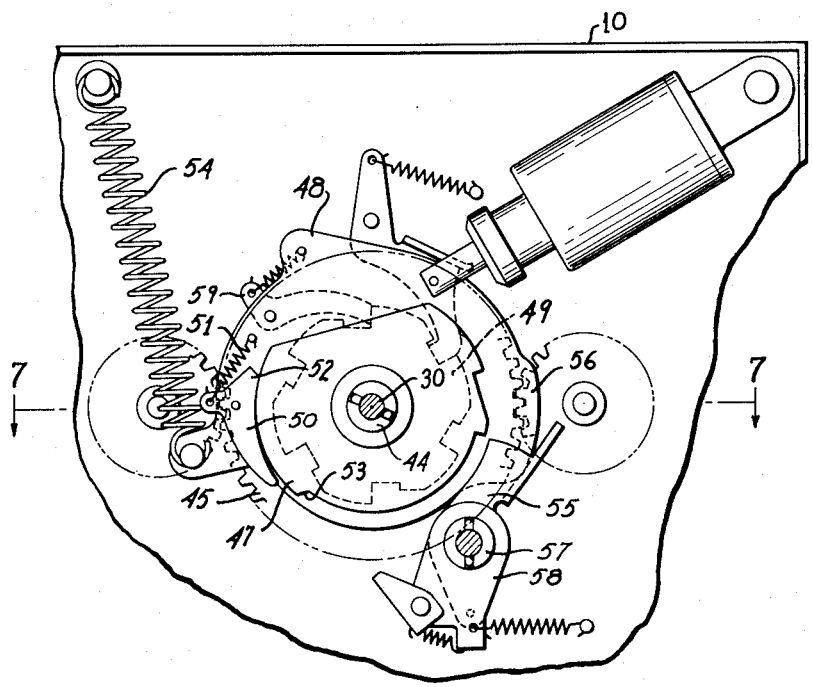
Figure 7:
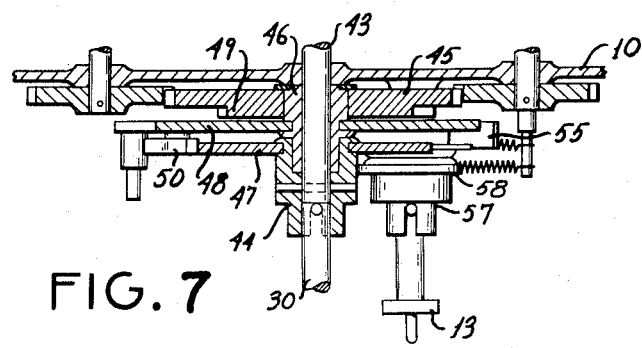

In the drawings, FIG. 1 is a front view of a fuel dispensing unit equipped with a computer register and a ticket printing register; FIG. 2 is a side view; FIG. 3 is an enlarged front view showing the relative position of the significant operating parts; FIG. 4 is a diagrammatic view of the reset for the ticket printing and computer registers; FIG. 5 is a detail showing the interlock between the reset and the motor switch; FIG. 6 is a fragmentary view showing an interlock coupling; and FIG. 7 is a view taken on line 7—7 of FIG. 6.

The conventional parts of the dispensing unit 1 are readily identified, 2 being the motor driving a pump 3 discharging through line 4 and meter 5 to a dispensing hose 6 equipped with the usual dispensing nozzle 7 which when not in use rests on a bracket or shelf 8 on the outside of the unit. The meter 5 through a shaft 9 drives a computer register 10 having an indicator 11 for the price and an indicator 12 for the gallons of fuel delivered for example as shown in U.S. Patent 2,814,444 to H. N. Bliss. The computer register also has a trip member 13 for releasing the built-in automatic interlock, which locks the register in a position where it cannot be operated for the next delivery of fuel until it is reset by a separate manual operation or movement of the trip lever 13 as generally shown in the aforementioned said patent to H. N. Bliss. Thus, trip member 13 normally releases a spring mechanism which automatically returns the indicators 11 and 12 of register 10 to zero. The register 10 also includes as a part of this interlock a coupling which can be manually engaged and disengaged as subsequently described. Until the interlock is released or tripped, the dispensing unit cannot be operated to deliver fuel. This interlock is part of the computer register in common use on fuel dispensing units and will be referred to as the computer register interlock.

The computer register has a shaft 14 driven by the meter carrying a bevel gear 15 meshing with a bevel gear 16 on a vertical shaft 17 which drives a ticket printer register 18 through a gear train 19, 20, 21. In the use of the ticket printer, a ticket is inserted through a slot 21a and at the start of a fuel delivery is printed with an initial or zero reading. The initial printing also locks the ticket in place. At the end of the fuel delivery, it is intended that the ticket printer be again operated to print the total of the fuel delivery, which is also exhibited on the computer register. If the ticket printer is not printed at the end of a delivery, the figures accumulate and are added to a succeeding delivery so that when finally printed the total represents more than a single delivery. Such false printing is prevented in the mechanism subsequently to be described by the use of a common interlock which prints the ticket and clears or resets the ticket printer register to zero at the same time and with the same manual operation as is required to reset the computer register interlock. The use of the common interlock is made mandatory by the fact that the interlock also controls the motor switch so that proper operation of the common interlock is essential.

The common interlock for the ticket printer and computer registers is operated through a hand crank 22 fixed to a shaft 23 carrying a gear 24 (FIG. 4) which meshes with a gear 25 of twice the number of teeth. The gear 25 in turn meshes with a gear 26 of the same size as the gear 24 and fixed to the shaft 27 in the ticket printer register which controls the printing and resetting of the register. The operation of the ticket printer requires two successive 360 degree rotations of the shaft 27 and has a built in interlock preventing reverse rotation of the shaft 21 or changing of the printing sequence. The first 360 degree rotation, which should be made at the start of the fuel delivery, prints the initial or zero reading of the register and locks the ticket in the register. The second 360 degree rotation, which should be made at the end of the fuel delivery, prints the registered totals for the delivery, resets the computer register coupling, and releases the ticket. Note that the figures remain on the computer register for visible reference, until the computer register interlock is tripped by trip lever 13 and the register is reset to zero. Each of these operations requires turning the crank 22 through a complete revolution. The ticket printer in common use has suitable mechanism provided for stopping the crank 22 at the end of each full revolution so that the operator merely turns the crank as far as it will go, one complete revolution for each printing operation.

While the crank 22 is turning a complete revolution, the gear 25 turns a half revolution. The two revolutions of the crank 22 necessary to make the two printed records accordingly results in a single revolution of the gear 25 which is utilized to reset the computer register interlock and to control the pump motor 2.

Before a fuel delivery can be made, the computer register interlock must be released by the manual trip lever 13 resetting of the computer register to zero. At this point, a link 28 connected between the gear 25 and a crank arm 29 fixed to a shaft 30 is in the lowermost position shown in FIG. 4. Shaft 30 constitutes an extension of the manually controllable coupling forming a part of the computer register interlock to engage and disengage the computer mechanism to register gallons and the cash value, in a standard and well-known manner. The coupling can only be engaged with the register 10 having the reference zero reading established in indicators 11 and 12. For example shaft 30 may constitute the extension of the control engaging shaft shown in the aforesaid Bliss Patent 2,814,444. In this position, a crank arm 31, likewise fixed to the shaft 30, acts through a link 32 to hold a cam 33 in the position illustrated in FIG. 5 in which a pin 34 at the upper end of a rod 35 is at the right hand end of cam slot 36. The cam 33 is fixed to a shaft 37 extending through the side of the dispenser unit above the bracket 8 and carrying on its outer end a knob 38 having a projection 39 at its right hand or outer end which in the position shown in FIG. 2 permits the nozzle 7 to rest on the bracket 8. When the shaft 37 is turned 90 degrees in a clockwise direction from the position illustrated in FIGS. 2 and 4 (a counterclockwise direction as viewed in FIG. 5), the projection 39 on the knob moves directly over the bracket 8 so that the nozzle cannot be rested on the bracket. In a conventional dispensing unit, the knob 38 would be the handle by which the attendant reset the computer register to zero and turned the dispensing unit motor on at the start of the delivery and shut the motor off at the end of the delivery. In this unit, the knob 38 is not large enough to serve as a manual operator and has only the function of preventing replacement of the nozzle 7 on the bracket 8 before the motor has been turned off by moving the knob to the horizontal position illustrated in full lines in FIG. 2. In order to turn the knob 90 degrees in a clockwise direction as viewed in FIG. 2 (a counterclockwise direction as viewed in FIG. 5), the crank 22 is turned a full revolution in a clockwise direction as viewed in FIG. 2. This turns the gear 25 180 degrees in a counterclockwise direction as viewed in FIG. 4 and moves the crank pin 40 at the upper end of the link 28 from the lowermost position illustrated in FIG. 4 to an upper position illustrated in dotted lines at 41. This turns the shaft 30, 90 degrees in a counterclockwise direction, as viewed in FIG. 5, resetting the computer register to zero, and makes a corresponding movement of the shaft 37 in the opposite direction. The rotation of the plate 33 is transmitted through the cam slot 36 to the rod 35 connected at its lower end to the motor switch 42 and turns the motor on thereby starting the pump and conditioning the dispensing unit for fuel delivery. The initial 360 degree rotation of the crank 22, which can be made only after the computer register interlock has been tripped by the trip lever 13, accordingly does three things: It prints the initial or zero reading on the ticket inserted in the slot 19 and locks the ticket in place; it resets the computer register to zero; and it starts the motor 2 of the dispensing unit so that fuel delivery can be made from the nozzle 7, which has previously been removed from the bracket 8. Note that the nozzle 7 must be removed from the bracket before the initial 360 degree rotation of the crank 2 can be made.

At the end of the fuel delivery, the attendant makes a second 360 degree revolution of the crank 22 which, through the gear 26, prints the accumulated figures on the ticket, resets the ticket printing register 18 to zero and releases the ticket so that it can be removed from the slot 21a and delivered to the customer. At the same time, the gear 25 is rotated a half revolution thereby returning the link 28 from the uppermost position to the lowermost position illustrated in FIG. 4. This return movement of the link 28 does three things: First, it shuts off the dispensing unit motor by moving the cam plate 33 back to the position illustrated in FIG. 5; second, it rotates the shaft 30 associated with the computing register back to the disengaging position illustrated in full lines in FIG. 4 thereby resetting the computer register interlock to the position locking the computer register so it cannot be operated until the computer register interlock is tripped by the trip lever 13; and third, it moves the projection 39 on the knob 38 away from the bracket 8 so that the nozzle 7 can be replaced on the bracket. All of the parts of the ticket printing register have now been returned to the zero position and are locked there by the computer register interlock which must be released by the trip lever 13 to condition the pump for delivery to the succeeding customer. The figures on the computer register remain until the trip lever is actuated and the computer register reset to zero.

Referring particularly to FIGS. 6 and 7, a coupling corresponding to that shown and more fully described in the previously referred to Bliss Patent 2,814,444 is shown forming a part of register 10.

The coupling as shown in FIGS. 6 and 7 is generally described for purposes of showing its connection to this invention. A more complete description appears in the aforesaid Bliss Patent 2,814,444. The coupling includes a reset shaft 43 having a coupling 44 connected to the shaft 30. A resetting gear 45 for resetting the computer register 10 to zero is rotatably mounted on a hub 46 which in turn is rotatably mounted on the reset shaft 43 inwardly of the coupling 44. A drive plate 47 is secured to turn with the reset shaft 43. A control plate 48 is secured to hub 46 and behind the plate 48 is a notched disc 49 integrally formed with the resetting gear 45.

Pivoted on the outer face of the control plate 48 adjacent the periphery thereof is a drive pawl 50 which is biased in a clockwise direction by means of a spring 51. Pawl 50 has a nose portion 52 which is adapted to engage a shoulder 53 on drive plate 47 during a dispensing operation as a result of the initial turning of crank 22 and the attached shaft 43. When crank 22 is turned at the end of the dispensing operation, shaft 43 and the attached drive plate 47 rotate counterclockwise. The engagement of drive pawl 50 and the shoulder 53 of drive plate 47 causes similar movement of control plate 48. A reset spring 54 is secured to the control plate 48 and is shown in FIG. 6 in an unstressed state. The counterclockwise movement of control plate 48 extends and stresses spring 54 which urges control plate clockwise to the position of FIG. 6. A latching pawl 55 is normally held in position of FIG. 6 by a shoulder 56 of the control plate 48 and is released upon the rotation of plate 48. The pawl 55 pivots into engagement with a notch of the drive plate 47 to prevent reverse movement thereof and thus prevent reverse movement of the attached resetting shaft 43. Consequently, the crank 22 cannot be again operated to operate the pump until the drive plate has been reset.

Drive plate 47 is released by actuation of the trip member 13, as follows.

The trip member 13 is connected to a pivotally mounted release connector 57 of the coupling. An arm 58 is secured to connector 57 and is adapted to engage the outer end of pawl 50 which is aligned therewith during the turning of the control plate 48 and stressing of spring 54, previously described. The control plate 48 is then released and under action of spring 54 rotates clockwise.

The rotation of plate 48 is transmitted through a pawl 59 which is secured to plate 48 to the notched disc 49 and thus to the resetting gear 45 which automatically resets the computer register 10 to zero.

At the completion of the resetting movement, the shoulder 56 of the control plate 48 cams out the latching pawl 55 and frees the driving plate 47 to establish the state of FIG. 6. The operator may now again turn crank 22 to condition the pump for another dispensing operation.

It will be noted that the printing of erroneous information on the ticket inserted in the slot 21a is made impossible, because the control of the dispensing unit motor and of the resetting of the interlock for the computer register are entirely through the ticket printing register. It is not possible for the attendant to use the pump without first clearing the ticket printing register of figures from the prior delivery. This prevents the accumulation of figures for more than a single delivery on the ticket printing register.

When used for deliveries for which no printed record is desired, the pump operates in the same manner as a conventional pump. When a delivery is to be made, the computer register shows the totals for the last delivery and the pump is locked so it cannot be used until the computer register is reset to zero. This is done by first actuating the trip lever and then turning the crank 22 through one full revolution. To replace the nozzle and shut off the motor at the end of a delivery, the crank 22 is turned through another full revolution, thereby returning the pump to the initial condition where the pump is locked with the totals appearing on the computer register.

The computer register and the ticket printing register are both highly developed commercial devices, each with its own safeguards. However, unless the ticket printing register is interlocked with the computer register in the manner disclosed, it is possible to print erroneous information about fuel deliveries.

What is claimed as new is:

1. A fuel dispensing unit having a switch for the fuel delivery, a computer register for the fuel delivery with an associated interlock means compelling resetting to zero before the unit can be used for another delivery, a printing register for sequentially printing the initial status of the computer register at the start of a fuel delivery and the final status of the computer register at the end of a fuel delivery and resetting the printing register to zero, said printing register having an associated interlock preventing changing the sequence, a trip member for the computer register interlock which must be actuated before the start of the delivery to reset the computer register and to permit engagement of the computer register, a crank for actuating the printing register for the two successive printing steps, a cam shaft connected to the computer register and to the switch and driven by the crank, and interlock means operated by said cam shaft in the first printing step for operatively engaging the computer register and turning the switch on to permit the start of fuel delivery and operated by said cam shaft in the second printing step for turning the switch off to stop the fuel delivery and operatively disengaging the computer register to prevent further use of the unit until said trip member is actuated.

2. A fuel dispensing unit having an on-off switch for the fuel delivery, a computer register for the fuel delivery with an associated interlock means compelling resetting to zero before the unit can be used for another delivery and being engageable and disengageable, a trip member for the computer register interlock which must be actuated before the start of the delivery so the computer register can be engaged, a printing register for sequentially printing the initial status of the computer register at the start of a delivery and the final status of the computer register at the end of a delivery and resetting the printing register to zero, a common manually operated interlock device for actuating the printing register for the two successive printing steps, said device in the first printing step turning the switch on and engaging the computer register, said device in the second printing step turning the switch off and disengaging the computer register interlock.

3. A fuel dispensing unit having an on-off switch for the fuel delivery, a computer register for the fuel delivery and being engageable and disengageable, a printing register for sequentially printing the initial state of the computer register at the start of a delivery and printing the final state of the computer register at the end of a delivery and resetting the printing register to zero, and a manually operated interlock common to the printing and computing registers and operable in two successive steps, said interlock in the first step engaging the computer register and actuating the printing register to print the initial status of the computer register and turning the switch on, and said interlock in the second step actuating the printing register to print the final status of the printing register and resetting the printing register to zero and turning the switch off.

4. A fuel dispensing unit having a switch for the fuel delivery, a computer register for the fuel delivery with an associated interlock means compelling resetting to zero before starting another delivery and being engageable and disengageable, a printing register for sequentially printing the initial status of the computer register at the start of a fuel delivery and the final status of the computer register at the end of a fuel delivery, said printing register having an associated interlock preventing changing the sequence, a support for the fuel delivery nozzle, a part for preventing replacement of the nozzle on its support while the switch is on, a crank for actuating the printing register for the two successive printing steps, a cam shaft connected to the computer register and to the switch and driven by the crank, and interlock means operated by said cam shaft in the first printing step engaging the computer register and turning the switch on to permit the start of fuel delivery and moving said part to a position preventing replacement of the nozzle on its support and operated by said shaft in the second printing step turning the switch off to stop the fuel delivery and moving said part to a position permitting replacement of the nozzle on its support.

5. A fuel dispensing unit having an on-off switch for the fuel delivery, a computer register for the fuel delivery and being engageable and disengageable, a printing register for sequentially printing in the initial status of the computer register at the start of a delivery and the final status of the computer register at the end of a delivery, a support for the fuel delivery nozzle, means for blocking and unblocking the nozzle support, and a manual interlock operable in two steps, said interlock in the first step engaging the computer register and turning the switch on and blocking the nozzle support and actuating the printing register to print the initial status of the computer register, said interlock in the second step turning the switch off and unblocking the nozzle support and actuating the printing register to print the final status of the computer register.

6. An interlock mechanism for a fuel dispensing unit having an on-off control for controlling fuel delivery and housing a register to register the fuel delivered and a separate recorder to provide a separate record of the fuel delivered, said register including a releasable coupling connecting the register to a fuel flow responsive means in the dispensing unit, which comprises an actuator adapted to be mounted in the dispensing unit for movement between two preselected positions, recorder control means connected to the recorder and to the actuator to sequentially actuate the recorder for recording beginning and terminal readings and to automatically reset the recorder to the beginning reading following recording of the terminal reading, register control means to sequentially latch and release the coupling for the register, and means connected to the actuator and to the register control means to latch the coupling incident the first operation of the recorder in which recording of the beginning reading is established and to release the coupling incident the next succeeding recorder operation in which recording of the terminal reading is established.

7. An interlock mechanism for a fuel dispensing unit having an on-off control conditioning the unit for fuel delivery and housing a register to register fuel delivered and a separate recorder to provide a separate record of the fuel delivered, said register including a releasable coupling connecting the register to a fuel flow responsive means in the dispensing unit and said recorder having a rotatable one-way operator, which comprises a crank journaled in the dispensing unit, a main drive gear secured to the crank for synchronous rotation with the crank, an intermediate gear rotatably mounted in mesh with the main drive gear and having twice as many teeth as the main drive gear, a driven gear rotatably mounted in mesh with the intermediate gear and connected to the operator of the recorder to record the reading of the recorder, a control link connected to the intermediate gear for reciprocation incident rotation of the intermediate gear, and means connecting the control link to the releasable coupling to establish an operative coupling during one half revolution of the intermediate gear and to release the coupling during the second half revolution of the intermediate gear.

References Cited in the file of this patent
UNITED STATES PATENTS

| | | |
|---|---|---|
| 2,354,249 | Eickmeyer et al. | July 25, 1944 |
| 2,554,296 | Crews | May 22, 1951 |
| 2,612,428 | Vroom | Sept. 30, 1952 |